United States Patent Office 3,129,199
Patented Apr. 14, 1964

3,129,199
PROCESS FOR PREPARING HIGH IMPACT MATERIAL BY POLYMERIZING STYRENE IN THE PRESENCE OF DIENE RUBBER AND POLYSTYRENE
Hans E. Lunk, Oakland, Calif., assignor to Shell Oil Company, New York, N.Y., a corporation of Delaware
No Drawing. Filed Jan. 30, 1961, Ser. No. 85,468
9 Claims. (Cl. 260—45.5)

The present invention relates to an improved process of preparing a polyvinyl aromatic molding composition and more particularly to a process for preparing a polystyrene molding composition having improved properties of toughness.

Recently, much effort has been devoted to the production of polystyrene molding compositions having improved properties of toughness which are known in the art as high impact polystyrenes. Impact is considered the primary desire, but frequently an increase in impact results in a decrease of other desired properties. For example, increase in impact may result in a rather large decrease in hardness. Accordingly, it is desirable to improve the impact of high impact polystyrene without sacrifice of other properties. As a general rule, the combination of impact strength and elongation is used to show toughness.

Conventional high impact polystyrene compositions contain polymeric styrene and a rubber polymer. It is known to obtain good compositions by physically blending polystyrene and rubber polymer or by mixing the rubber polymer with monomeric styrene and polymerizing the mixture. Many types of rubber materials have been tried including natural rubber, but best results were heretofore obtained by using a copolymer of butadiene and styrene such as GRS rubber as the rubber polymer.

As shown in the copending application of Carl W. Schroeder, Hans E. Lunk and Marshall E. Doyle, Serial No. 4,206, filed January 25, 1960, it has been found, quite unexpectedly, that when polybutadiene having a high cis 1,4-content is used as the rubber polymer, a stable material may be obtained which has excellent physical properties. It is not known why the high cis 1,4-polybutadiene gives better results, but this form not only gives improved physical properties of strength, but it also gives improved stability. This improved stability is particularly noticeable at higher temperatures.

Although the use of high cis 1,4-polybutadiene has provided a product having improved toughness, it was found that the agitation conventionally used during polymerization has an effect on the product properties and that excessive agitation had to be avoided. In the case of high cis polybutadiene, the upper limit of agitation corresponds to, say, 11 to 13% conversion, and for other conjugated dienes such as high cis isoprene no improvement in products was obtained regardless of the degree of agitation. Commercial processing which is at present used for bulk polymerizing high impact polystyrene requires agitation for temperature control in the first stage of the polymerization process. Such first stage may polymerize monomer to say 20 or even 25% conversion, and therefore it has not been considered commercially attractive to utilize high cis polybutadiene in present commercial equipment.

Thus it is a primary object of this invention to provide a process for utilizing high cis polybutadiene without severe loss of physical properties being caused by agitation during the early part of the polymerization thereof.

It is another object of this invention to provide a process where conjugated dienes in general which are polymerized to a high cis content such as high cis polyisoprene may be utilized to provide high impact polystyrene.

These and other objects are obtained by a process of preparing a high impact resinous composition of polymerized vinyl aromatic compounds in which the monomers utilized in the resinous composition consist essentially of from about 2 to about 20 parts by weight of a conjugated diene and from about 80 to 98 parts by weight of monovinyl aromatic compound, comprising the steps of mixing from about 2 to 20 parts of a rubber which is a polymer of conjugated diene, with a crosslinking agent and also with from about 1 to about 30 parts by weight of the monovinyl aromatic compound in polymerized form, milling the mixture for a time and temperature sufficient to disperse and crosslink the rubber, adding from about 50 to about 97 parts by weight of monomeric monovinyl aromatic compound to the mixture, agitating the mixture to form a solution of polymer in monomer, said solution containing dispersed rubber particles, and subjecting said solution to polymerizing conditions whereby substantially all of the monomer is polymerized.

In its broad aspect, the present invention includes polymers of styrene and substantial equivalents thereto. Thus polyvinyl aromatic molding compositions may be obtained according to the present invention which are solid polymer or copolymers of vinyl aromatic compounds having the vinyl group attached to a carbon atom of the aromatic nucleus. These vinyl aromatic compounds may have the aromatic nucleus substituted with one or more groups such as methyl, ethyl and chloro groups. Examples of such monomers are vinyl toluene, vinyl xylene, vinyl ethyl benzene, and vinyl chloro benzene.

In its broad aspect the present invention includes as the rubber component polymerized conjugated dienes such as butadiene and substituted butadienes. Thus in its broad aspect, the rubber component should be a high cis polymer of the structure $R_2C=CR—CR=CR_2$ in which R is an inert substituent such as hydrogen, halogen, or lower alkyl groups having from, say, about 1 to 4 carbon atoms. The polymerized conjugated diene which is also referred to herein as rubber may be either synthetic or natural with the important criteria being a content of at least about 90% cis 1,4-units. In its more preferred form, the conjugated diene will be

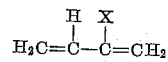

in which X is selected from the group consisting of hydrogen, chlorine and methyl. The most preferred material is butadiene.

The improved compositions of the present invention comprise from about 2 to about 20 parts of the polymer of conjugated diene characterized by having at least 90% cis 1,4 units, and from about 80 to about 98 parts polymerized vinyl aromatic compound. Preferably, the molding composition of the present invention comprises an interpolymer of from about 2 to about 10 parts of conjugated diene having at least 90% of cis 1,4 units, and from 90 to 98 parts styrene.

The relative proportions of conjugated diene and vinyl aromatic compound mentioned above cover the preferred amounts, but the values may be varied. In other words, when the rubber content gets too low, the impact strength decreases, and when the rubber content gets too high, factors like loss of hardness and tensile strength become excessive. The most optimum proportions are believed to be from about 3 to about 6 parts of rubber to from about 94 to about 97 parts styrene. However, the optimum proportions vary according to the properties desired in the final product, and extra high impact molding compositions may contain up to 15 or 20% rubber.

An essential feature of this invention resides in the use of a polymerized conjugated diene having a high cis 1,4 content. In general, the cis 1,4 content should be above 90%, and preferably above 95%. By the term, "cis 1,4 content," it is meant that the polymerization of the conjugated diene takes place in a linear chain at the 1 and 4 carbon and the remaining double bonds have substituents on the same side. After polymerization, a certain amount of gel may form without adverse effect on the final product, but the percent cis 1,4 units are computed on the basis that no gelling has taken place, and that one double bond remains for each diene component.

When the substituents are on opposite sides, a trans 1,4 structure results. This structure is not believed to be adverse by itself, but must necessarily be below 10% in order to have 90% cis 1,4 units. However, excessive 1,2 polymerization has been found to be undesirable. The diagrams below illustrate these structures more fully by showing the structures for polybutadiene.

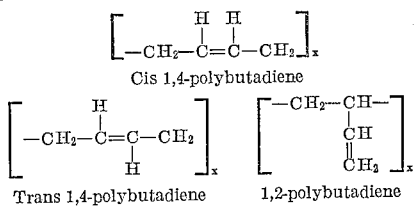

Cis 1,4-polybutadiene

Trans 1,4-polybutadiene        1,2-polybutadiene

Inert ingredients such as conventional filler materials and antioxidants for polystyrene may be added to the molding composition. They may be added at any convenient time during the preparation of the molding composition of this invention.

It is also generally desirable to add a lubricant in order to improve moldability of the composition, and any of the known lubricants may be used in this invention. Examples of lubricants include ester lubricants such as butyl stearate, mineral oil, paraffin wax and combinations of these lubricants.

The high cis 1,4 conjugated diene may be prepared by polymerizing the conjugated diene in liquid phase at a temperature ranging from about −40° C. to about 150° C. and pressures below about 500 p.s.i. in the presence of a liquid catalyst composition prepared by aging a hydrocarbon mixture of a solid low pressure catalyst such as a Ziegler-type catalyst. In addition, high cis polybutadiene and high cis polyisoprene are now commercially available and commercial products may be used provided they contain the characteristics required in the present invention.

In order to further provide an illustration for the preparation of high cis conjugated dienes, the preparation of high cis 1,4-polybutadiene is illustrated by the following specific examples.

POLYBUTADIENE A

A soluble catalyst is prepared in 600 ccs. of benzene from 40 gms. of $CoCl_2$ and 315 gms. of triisobutyl aluminum by aging at room temperature for nine days. It has an analysis of 350 mg./li. of Co, 9600 mg./li. of aluminum and 2.85% w. of chlorine. A 10% solution of butadiene in 18,800 gms. of benzene is polymerized with 480 gms. of the liquid fraction in 3 hours at 55° C. The reactor for this experiment is a 5 gallon steel autoclave equipped with an agitator. At 36% conversion there is obtained polybutadiene having a cis 1,4-content of 98% and 1% each of the trans 1,4- and 1,2-polymer. The work-up comprises coagulating with an equal volume of isopropyl alcohol, filtering and drying.

POLYBUTADIENE B

A soluble catalyst prepared from 5 gms. of cobalt chloride and 3.4 gms. of aluminum ethyl sesquichloride on aging for 4½ days at room temperature in 150 ccs. of benzene has the following analysis: Co, 134 mg./li., Al 7500 mg./li. and Cl 10,800 mg./li. A 20% solution, by weight, of butadiene in benzene is polymerized by 2%, by volume, of the above soluble catalyst in 15 minutes at room temperatures. The polymer obtained by using this catalyst in the procedure of Polybutadiene A above contains 98.5% of the cis 1,4-addition product, of I.V. 6.6 at about 37% conversion.

A necessary condition for obtaining high impact strength in polystyrene resins is the presence of small rubber particles, 1–50 microns in size, in a matrix of polystyrene. These particles are formed through agitation during the first stage of polymerization of the rubber solution when a phase separation takes place.

In the case of cis-polybutadiene the rubber phase is extremely shear sensitive and agitation can only be carried out to a low conversion of the monomer in order to prevent the rubber particles from becoming too small and ineffective. However, to achieve optimum properties a higher conversion in the first stage is very desirable. For this process the rubber particles are preformed and combined to withstand the shear conditions in the first stage of the polymerization. The use of gelled rubber would lead to a mixture that cannot be handled with conventional equipment. In this process, rubber particles of the proper size and degree of crosslinking are prepared by milling rubber, polystyrene and a peroxide. To this blend is added styrene monomer which dissolves the polystyrene and leaves the crosslinked rubber particles in the form of a dispersion. These particles are now sufficiently resistant to provide a much higher conversion with agitation during the first stage of the polymerization reaction.

The crosslinking agent is preferably a peroxide which should decompose at a reasonable rate at temperatures of, say, about 100° to 200° C. and preferably from about 140° to 170° C. The preferred peroxide is dicumyl peroxide. Another peroxide which may be used is ditertiary butyl peroxide.

The amount of peroxide necessary depends upon the peroxide used and the amount of crosslinking required. In general, the amount will be from, say about 0.1% to about 10% by weight of the rubber utilized. When high cis polybutadiene is used, the amount will be preferably within the range of 0.1 to 3%, but when high cis polyisoprene is used, it is believed that the preferred range is from about 3 to about 10%. The amount of polymerized vinyl aromatic compound mixed with the rubber should be sufficient to provide a dispersion of rubber particles, and yet should be low enough such that the range percentage of vinyl aromatic compound will be polymerized while containing the partially cured rubber particles. Thus it should be from, say, about 0.5 to about 5 times the amount of polymerized vinyl aromatic compound to rubber and preferably the ratio will be in the order of about 1:1.

When the materials are to be blended they may be rendered homogeneous by mechanical working through any known method. For example, such working may be accomplished in a Banbury mixer or by milling in a two-roll mill. After the peroxide, rubber and styrene are intimately mixed and heated for a time sufficient to partially cure the rubber as indicated above, the material is then added to sufficient monomeric vinyl aromatic compound to make up the desired proportions of rubber and vinyl aromatic compound in the final mixture. The vinyl aromatic compound dissolves the polymer of vinyl aromatic compound and leaves the partially crosslinked rubber particles in a state of dispersion in the solution.

The solution is then subjected to conditions which will cause the vinyl aromatic compound to polymerize with the rubber. Such conditions are known in the art, and include heat, catalysts such as peroxide catalysts, ionizing irradiation, and a combination of heat and catalyst. Good results are obtained by heating the solution to a temperature of from about, say 95° to about 200° C. for a time sufficient to polymerize substantially all of the styrene.

This heating is done without addition of catalysts, but the addition of catalysts allows the use of lower temperatures.

In general, a lubricant is preferably added before the bulk polymerization is conducted. Thus in a preferred procedure, a solution is prepared which consists essentially of from about 2 to about 10 parts of high cis 1,4-polybutadiene, about 90 to 98 parts of styrene, and about 1 to 6 parts of a lubricant. The solution is heated to about 95° C. and allowed to polymerize with sufficient cooling being provided to prevent the temperature from exceeding about 200° C. After the polymerization is complete, the product will contain about 1 to 2% unpolymerized styrene. This is preferably removed by any of the known methods for removing residual monomer from polystyrene. Such methods include subjecting the polymer to a vacuum to distill out monomer or by working in a devolatilizing extruder. The devolatilizing extruder is considered the best method at the present time.

It is possible to allow the temperature to vary over a wide range during the polymerization without adverse effect on the properties of the resulting polymer composition. In prior processes, this has been a serious problem because the polymerization reaction builds up heat from reaction which give localized high temperatures. After the polymerization has proceeded to some extent, stirring is no longer available to avoid this problem, because the solution becomes too viscous to be stirred. However, the present method avoids this problem, because the heat of reaction may be allowed to build up to some extent since heating is permissible through the range of, say 95° to 200° C. without any adverse effect on the properties of the final composition. This unexpected property is due to the use of high cis 1,4 rubber and it is particularly noticeable with high cis 1,4-polybutadiene. Thus it is seen that the present process not only provides a superior product, but the better stability also provides for improved polymerization process. This process is particularly adaptable to large plants where the temperature control is more difficult than in smaller runs where the solution is more easily cooled.

Another problem which has been difficult in conventional procedures relates to the removal of polymer product from the polymerization apparatus. It has been suggested to heat the polymer to assist in outflow, but heating has an adverse effect on most high impact polystyrenes and causes degradation. However, polystyrene molding compositions made according to the present invention have improved heat stability and may be raised to temperatures of 200° C. or even higher after the polymerization is complete without degradation of the product. Thus the problem of polymer removal is considerably decreased.

The present invention also allows polymers to be easily prepared which have a higher intrinsic viscosity than heretofore, and generally higher viscosities provide better physical properties. Preferably, the interpolymer should have an intrinsic viscosity of at least 0.5 and preferably between 0.8 and 1.2.

The intrinsic viscosity of the high cis diene polymer such as high cis 1,4-polybutadiene which is used to make the polymer may vary through a range of about 1 to about 8. However, it is believed that high cis 1,4-polybutadiene having viscosities of 2.0 to 3 which is now commercially available may be preferred for that reason in addition to the fact that it provides excellent results. The molding compositions of this invention may be mixed with plasticizers to improve moldability.

In order to better illustrate the invention, the following examples are given:

*Example I*

Polybutadiene having an intrinsic viscosity of 2.5 and containing about 95.5% cis 1,4 units, 2% trans 1,4 units and 2.5% 1,2 units was compounded with 0.5 parts dicumyl peroxide per 100 parts by weight of polybutadiene at room temperature and then milled on a three-inch roll mill with 100 parts of polystyrene at 145–160° C. for five minutes. This broke up the rubber into small pieces within the polystyrene and gelled it. Ten parts by weight of this mixture was then dissolved in 90 parts by weight of styrene (only the polystyrene dissolves while the crosslinked rubber particles form a dispersion). The styrene was then thermally polymerized by heating for 10 hours at 95° C. with stirring and then heated for the following periods without stirring: 4 hours at 110° C., 4 hours at 125° C., 3 hours at 145° C. and 12 hours at 180° C. The polymer was molded into test samples and the following properties were found: Impact strength, 2.41 ft. lb./in.; hardness 16 (Rockwell M); elongation 28% and a yield strength of 2720 p.s.i.

*Example II*

The procedure of Example I was repeated except that the stirring time during the first part of the polymerization step was varied as shown in the table below, and the heating was conducted for 18 hours at 95° C., 2 hours at 145° C. and 20 hours at 195° C. The table below illustrates the effect of stirring time on the impact strength.

| Stirring Time, hours | Impact Strength, ft. lb./in. | Hardness Rockwell "M" |
| --- | --- | --- |
| 12 | 1.27 | 24 |
| 15 | 1.24 | 20 |
| 17 | 1.16 | 20 |

Although the impact strength was not so good as in Example I where a different heating cycle was used, Example II illustrates that stirring has a comparatively small effect on the impact strength when the procedure of the present invention is used.

For the sake of comparison, variation of stirring time for a conventional polymerization is given in which the total monomers contain 5% high cis polybutadiene.

A solution was prepared containing 95% styrene and 5% of a high cis polybutadiene having an I.V. of 3.79, a Mooney viscosity of 135 and was 98.1% cis 1,4, 0.9% trans 1,4 and 1.0% 1,2 and containing 2.2 parts per hundred PBNA (phenyl beta naphthylamine). 3 parts of paraffin wax and 1 part of mineral oil lubricant was added and the mixture polymerized according to the following cycle: 18 hours at 95° C., 3 hours to and at 145° C., 3 hours to 195° C., and 12 hours at 195° C. Stirring was varied from 0 to 12 hours at the beginning of the cycle for various runs and the effect on the impact strength of test bars molded from the various products is as follows: 0 hours stirring—1.83, 2 hours—1.64, 6 hours—2.04, 9 hours—0.32, and 12 hours—0.35.

Since it is usually desirable to stir the mixture for at least about 10 hours, it is seen that the process of the present invention is advantageous. Similar improvements were obtained when cis-polyisoprene was crosslinked prior to interpolymerization as shown in Example III below, and the process of the present invention provides a noticeable improvement.

*Example III*

Polyisoprene containing about 92% cis 1,4 units and the remainder mostly 1,2 units was compounded with 2.5 parts dicumyl peroxide per 100 parts of polyisoprene at room temperature. The rubber was then milled with polystyrene, added to styrene and polymerized using the proportions and procedure of Example I above. Test bars molded from the resulting polymer had an Izod impact of 0.53 ft. lbs./in., an elongation of 20%, yield strength of 3095 p.s.i. and a hardness of 20 (Rockwell M). For the sake of comparison a polymer was prepared by polymerizing a solution of 5 parts of polyisoprene and 95 parts styrene. The heating and stirring was conducted according to the cycle given above. This polymer provided a test sample having an impact of 0.28 ft. lbs./in.

Although Example III does not demonstrate as high an impact as Example I, it is believed better results would be obtained by using a higher concentration of peroxide and thereby obtaining a higher degree of crosslinking. Accordingly, it is preferred to use from 3 to 10% peroxide by weight based on the amount of rubber when high cis polyisoprene is used.

I claim as my invention:

1. A process of preparing a high impact resinous composition of polymerized vinyl aromatic compounds in which the monomers utilized in the resinous composition consist essentially of from about 2 to about 20 parts by weight of a conjugated diene and from 80 to 98 parts by weight of monovinyl aromatic compound, comprising the steps of mixing from about 2 to 20 parts of a rubber having a cis, 1,4 content above about 90% and which is a polymer of conjugated diene with a crosslinking agent and also with from about 1 to about 30 parts by weight of the monovinyl aromatic compound in polymerized form, milling the mixture for a time and temperature sufficient to disperse and crosslink the rubber, adding from about 50 to about 97 parts by weight of monomeric monovinyl aromatic compound to the mixture, agitating the mixture to form a solution of polymer in monomer, said solution containing dispersed rubber particles, and subjecting said solution to polymerizing conditions whereby substantially all of the monomer is polymerized.

2. The process of claim 1, in which from about 2 to about 10 parts of conjugated diene and from about 90 to about 98 parts of monovinyl aromatic compound are used.

3. The process of claim 1, wherein the rubber is a polymer of a conjugated diene, said polymer having a cis, 1,4 content greater than about 95%.

4. The process of claim 1, in which the crosslinking agent is a peroxide and the milling temperature is from about 140° C. to about 170° C.

5. A process of preparing a high impact polystyrene composition in which the monomers utilized consist essentially of from about 2 to about 20 parts by weight of a conjugated diene and from about 80 to 98 parts by weight styrene, comprising the steps of mixing from about 2 to about 20 parts of a rubber which is a polymer of a conjugated diene characterized by containing above about 90% cis, 1,4 units with a crosslinking agent and also with from about 1 to about 30 parts by weight polystyrene, milling the mixture for a time and temperature sufficient to disperse and crosslink the rubber, adding from about 50 to about 97 parts by weight styrene to the mixture, agitating the mixture to form a solution of polystyrene in styrene containing dispersed rubber particles, and subjecting said solution to polymerizing conditions whereby substantially all of the styrene is polymerized.

6. The process of claim 5, in which the conjugated diene is butadiene.

7. The process of claim 5, in which the conjugated diene is isoprene.

8. The process of claim 5, in which the rubber contains more than 95% cis 1,4 units.

9. The process of claim 5, in which the crosslinking agent is a peroxide and the milling is conducted at a temperature of from about 140° C. to about 170° C.

References Cited in the file of this patent

FOREIGN PATENTS

| | | |
|---|---|---|
| 757,523 | Great Britain | Sept. 19, 1956 |
| 168,047 | Australia | Nov. 10, 1953 |